United States Patent [19]

Phillips et al.

[11] Patent Number: 5,610,372
[45] Date of Patent: Mar. 11, 1997

[54] SYSTEM FOR MEASURING TOTAL WEIGHT AND WEIGHT DISTRIBUTION OF A VEHICLE

[75] Inventors: Darryl H. Phillips, Sallisaw, Okla.; Robert W. Richardson, Chagrin Falls, Ohio

[73] Assignee: The Airsport Corp., Sallisaw, Okla.

[21] Appl. No.: 615,449

[22] Filed: Mar. 14, 1996

[51] Int. Cl.⁶ .......................... G01G 19/40; G01G 19/08; G01G 19/10
[52] U.S. Cl. .......................... 177/25.14; 177/1; 177/136; 177/141; 364/567
[58] Field of Search .............................. 177/25.11, 25.12, 177/25.13, 25.14, 136, 137, 138, 139, 141, 1; 364/567

[56] References Cited

U.S. PATENT DOCUMENTS

| | | | |
|---|---|---|---|
| 2,564,484 | 8/1951 | Kuehni | 73/432 R |
| 3,170,323 | 2/1965 | Kuhrt et al. | 73/432 R |
| 3,295,367 | 1/1967 | Rundell | 73/432 R |
| 3,545,265 | 12/1970 | McIlraith et al. | 73/432 R |
| 3,572,106 | 3/1971 | Jonas | 73/432 R |
| 3,688,570 | 9/1972 | Burke, Jr. | 73/136 A |
| 3,854,540 | 12/1974 | Holstrom, Jr. | 177/136 |
| 4,103,752 | 8/1978 | Schmidt | 177/141 |
| 4,119,911 | 10/1978 | Johnson et al. | 73/136 A |
| 4,312,042 | 1/1982 | Bateman | 364/567 X |
| 4,432,245 | 2/1984 | Hattori et al. | 73/862.32 |
| 4,490,802 | 12/1984 | Miller | 364/567 |
| 4,494,210 | 1/1985 | Miller | 364/567 |
| 4,548,079 | 10/1985 | Klatt | 73/432 R |
| 4,651,838 | 5/1987 | Hamilton et al. | 177/209 |
| 4,656,876 | 4/1987 | Fremd | 73/865 |
| 4,832,141 | 5/1989 | Perini et al. | 177/141 |
| 4,854,407 | 8/1989 | Wagner | 177/141 |
| 4,941,365 | 7/1990 | Reiner et al. | 73/865 |
| 4,979,398 | 12/1990 | Goodzey et al. | 73/862.34 |
| 5,133,212 | 7/1992 | Grills et al. | 364/576 X |
| 5,167,289 | 12/1992 | Stevenson | 177/141 |
| 5,215,154 | 6/1993 | Kirby | 177/136 |
| 5,297,044 | 3/1994 | Sakaki et al. | 364/424.1 |
| 5,391,843 | 2/1995 | Sato et al. | 177/141 |
| 5,410,109 | 4/1995 | Tarter et al. | 177/136 |
| 5,478,974 | 12/1995 | O'Dea | 177/25.14 |
| 5,493,920 | 2/1996 | Schedrat et al. | 177/136 X |

*Primary Examiner*—Michael L. Gellner
*Assistant Examiner*—Randy W. Gibson
*Attorney, Agent, or Firm*—William S. Dorman

[57] ABSTRACT

An object of the present invention is to calculate the gross weight of a moving vehicle, such as a tractor-trailer combination, from measurements acquired exclusively on the tractor. Measurements of force and acceleration are taken from, for example, the engine and or drive shaft. A related object of this invention is to accurately measure the weight distribution on the axles or tandems of a tractor-trailer combination based on measurements taken from either tractor suspension air bags or from tractor fifth wheel load, given the gross weight of the combination. The weight distribution on the axles is determined by combining sensor information taken from the fuel tank with sensor data taken from either the vehicle air springs of the vehicle or, alternatively, from a weight sensor on the fifth wheel with a known gross weight of the vehicle. Another object of the invention is to determine gross vehicle weight, in motion, using a single digital sensor to simultaneously determine force and acceleration.

20 Claims, 4 Drawing Sheets

SYSTEM FOR MEASURING TOTAL WEIGHT AND WEIGHT DISTRIBUTION OF A VEHICLE

I. BACKGROUND OF THE INVENTION

A. FIELD OF THE INVENTION

The present invention relates generally to a method for determining the gross weight of a tractor trailer combination from vehicle force and acceleration data acquired while it is in motion. It also relates generally to a method for determining the load weight distribution on each axle or tandem of a multi-axle vehicle from measurements made exclusively on the tractor portion of a tractor-trailer combination.

B. DESCRIPTION OF THE PRIOR ART

This invention relates generally to the determination of the gross weight and/or weight load distribution on each axle or tandem of a motor vehicle or, more particularly, tractor trailer combination. As is well known in the industry; of over-the-road tracking, the maximum weight of trucks on state and interstate highways is strictly controlled by statute. In addition, in many states not only is the total weight controlled, but also the amount of weight bearing on each axle or tandem of the truck. The conventional method of determining a vehicle's gross weight and axle weight distribution is to drive the truck onto road-side scales and weigh each set of axles in the tractor-trailer combination, a time consuming operation.

The inefficiency of the current scheme of fixed weighing locales has not escaped the notice of the trucking industry and pilot projects are already under way in some states which, if successful, could radically change current practices. One prominent example involves a regulatory proposal to equip every truck on the highway with an electronic transponder which would communicate truck data to a road side receiver. The transmitted data could include, for example, current real-time weight and weight distribution of the vehicle. Trucks so equipped would be allowed to bypass weight inspection stations if the transponder reported them to be within legal weight limits, thus saving fuel and time for the driver and allowing law enforcement resources to be redirected elsewhere.

Real-time in-motion weighing of a vehicle is a method of obtaining the weight of a vehicle without requiring it to come to a stop, thereby saving the driver time: the time waiting in line to be weighed and the time necessary to creep onto stationary scales.

The prior an of in-motion weighing of vehicles may be divided into two broad categories: means installed in (or on) the pavement, and means installed on the truck. In-pavement weigh-in-motion utilizes special scales which are designed to weigh a truck as it drives over them. These sorts of scales have been shown to suffer from several disadvantages, including insufficient accuracy, heavy dependance on the road surface and dynamics of the vehicle, lack of portability, and a requirement that the truck slow to a certain specific speed such as 25 miles per hour. Thus, they have not been found suitable for use on the open highway.

On-board weigh-in-motion, on the other hand, is accomplished in real-time by means located exclusively on the vehicle. This approach to gross weight determination can be combined with weight distribution to produce a complete regulatory weight profile of the vehicle. It may also be used as an improved means of apportioning braking effort and a means of sensing cargo theft. On-board weighing shows much greater promise than in-pavement methods and is the approach utilized in the present invention.

The truck driver or owner has a conspicuous pecuniary interest in maximizing the gross weight of his or her vehicle without exceeding statutory maxima. If the truck is too light, the truck is making a trip with fewer goods than it could conceivably carry and its owner is thus earning fewer dollars than he might otherwise. If the truck's total weight exceeds the statutory maximum, The operator risks confrontation with the authorities and a resulting heavy fine. Further complicating the matter is the fact that the driver of the tractor may drop off and pick up various items and possibly even exchange trailers during the course of the trip.

The Federal Highway Administration and the various state regulators of common carriers, on the other hand, have an interest in preserving the integrity of the highways. Overloaded trucks are notoriously destructive users of the highways and potentially dangerous to drive. The operators of such vehicles will be penalized if caught. But, conventional technology requires a suspect truck to be escorted to a weigh station and weighed, a prospect that may prove to be an enormous inconvenience for an innocent driver.

Heretofore, as is well known in the trucking industry, there has been a need for a method of determining the gross weight of a track and or tractor-trailer combination, and the distribution of that weight among the various axles, which is not fixed to one geographic location. Further, because of the nature of much of the industry, ideally that method would be designed to easily accommodate situations where the truck driver acquires a different trailer. In particular, the most logistically convenient design would entail a system that is attached to, and dynamically takes measurements exclusively from, the tractor portion of the vehicle. Weight measuring systems which are located, in whole or in part, on the trailer force the driver to either acquire a device for every different trailer or to relocate a single device from one trailer to the next when they are exchanged.

Accordingly, it should now be recognized, as was recognized by the present inventors, that there exists, and has existed for some time, a very real need for an easily usable and economically feasible device to dynamically determine the gross weight and weight distribution of a tractor-trailer combination and to address and solve the above-described problems.

Briefly, the system described herein provides a method for determining the gross weight, and the distribution of weight between the various axles or tandems, of a tractor-trailer combination using measurements made exclusively on the tractor.

After the present invention was conceived and constructed, a patent search was conducted in the United States Patent and Trademark Office for the purpose of determining whether any similar or related solutions had been previously developed to the foregoing problem. That patent search produced the following references relating to vehicle weight distribution:

| U.S. Pat. No. | Inventor | Title | Issue Date |
| --- | --- | --- | --- |
| 3,854,540 | Holmstrom, Jr. | Vehicle Weighing Means | Dec. 17, 1974 |
| 4,103,752 | Schmidt | Fifth Wheel Scale Apparatus | Aug. 1, 1978 |
| 4,651,838 | Hamilton et al. | Air Spring Control System and Method | Mar. 24, 1987 |
| 4,832,141 | Perini et al. | Vehicle Mounted Load Indicator System | May 23, 1989 |
| 4,854,407 | Wagner | System for Measuring Air Pressure on Drive Axles of Road Tractor Trailers and Load Distribution | Aug. 8, 1989 |
| 5,167,289 | Stevenson | Air Spring Load Monitoring System | Dec. 1, 1992 |
| 5,391,843 | Sato et al. | System for Measuring Carrying Weight of Vehicle | Feb. 21, 1995 |
| 5,410,109 | Tarter et al. | Vehicle On-Board Weighing System | Apr. 25, 1995 |

Holmstrom U.S. Pat. No. 3,854,540 discloses a means for determining trailer weight from measurements on the fifth wheel; Schmidt U.S. Pat. No. 4,103,752 discloses an apparatus for determining trailer weight from a sensor located on the fifth wheel assembly; Hamilton U.S. Pat. No. 4,651,838 discloses an air-spring based system for measuring vehicle weight; Perini et al. U.S. Pat. No. 4,832,141 discloses another vehicle weighing system based on air-bag suspension measurements; Wagner U.S. Pat. No. 4,854,407 discloses a system for measuring air suspension pressure on drive axles of tractor trailers and load distribution; Stevenson U.S. Pat. No. 5,167,289 discloses a method of measuring weight based on air spring loads; Sato et al. U.S. Pat. No. 5,319,843 discloses a weighing system based upon measurements of force applied to suspension cylinders; and Tarter et al. U.S. Pat. No. 5,401,109 discloses a system and method for measuring vehicle weights using data collected from the spring assemblies.

In apportioning the vehicle weight between the various axles or tandems, the instant invention improves upon and departs from existing art. Improvements include but are not limited to the following.

Holmstrom U.S. Pat. No. 3,854,540 utilizes air suspension (air bag) pressure sensing transducers located on the trailer to determine the weight resting on the axles. This requires that the trailer be equipped with air suspension, that certain equipment be located on the trailer, and that means be provided to interconnect the weighing circuits between the tractor and trailer. The present invention recognizes that in the trucking industry it is common practice to interchange tractors and trailers and that it is advantageous for a weight apportioning system to exist on the tractor only, with no equipment nor modifications nor interconnections to the trailer.

Wagner U.S. Pat. No. 4,854,407 discloses a system consisting of a mechanical air pressure gage with a specialized manually operated dial face, and a method for utilization of said system which requires the operator to proceed though a series of steps. In addition, Wagner is limited to a particular mechanical apparatus, and does not operate automatically nor while in motion.

Schmidt U.S. Pat. No. 4,103,752 discloses a weighing means that measures only the weight carried by the fifth wheel and does not offer a method or apparatus for determining weight on individual tractor axles, nor weight on the trailer axles, as is done in the present invention.

Hamilton et al U.S. Pat. No. 4,651,838 requires a "known weight distribution." The instant invention recognizes that load distribution is not usually known, and in certain circumstances such as the hauling of liquids or livestock, distribution does not remain constant. Further, a prime application for the present invention is enforcement of weight regulations, which requires that the weighing system function without any input from or manipulation by the vehicle operator, as would be necessary to implement Hamilton's scheme.

Perini et al U.S. Pat. No. 4,832,141 and Stevenson U.S. Pat. No. 5,167,289 disclose vehicle weighing systems that rely exclusively on air bag pressure. The instant invention recognizes that very few tractors have air suspension on the front axle and, thus, does not require any particular type of front axle suspension. Further, Perini and Stevenson require pressure sensors and associated apparatus to be permanently mounted on the trailer. This severely limits the ability of the operator to utilize different trailers, requires electrical interconnection between the tractor and trailer, and presents difficulties in maintaining calibration accuracy and traceability. The instant invention, with its focus on measurements taken exclusively on the tractor, is an improvement in the art in that it allows any trailer to be employed.

Sato et al U.S. Pat. No. 5,391,843 teaches an apparatus to find the weight of the load carded in a dump truck or the like. It requires load supporting cylinders on each axle, and does not consider the case of a tractor-trailer combination, nor does it determine gross weight of the vehicle.

Tarter et al U.S. Pat. No. 5,410,109 employs strain gage weight sensors. It requires sensors to be installed "at each suspension point of a vehicle to be weighed." As with Holmstrom, Perini, and Stevenson, this necessitates that equipment be permanently installed on each trailer that might be employed. The instant invention is an advance in the art, permitting unlimited trailer interchangeability.

The following additional references relating to gross vehicle weight determination were also located:

| U.S. Pat. No. | Inventor | Title | Issue Date |
| --- | --- | --- | --- |
| 3,572,106 | Jonas | Means for Measuring Angular Displacement of Coaxially Rotating Elements | March 23, 1971 |
| 4,548,079 | Klatt | Method and Apparatus to Automatically Determine the Weight or Mass of a Moving Vehicle | Oct. 22, 1985 |
| 4,656,876 | Fremd | Apparatus for Measuring the Mass of a Motor Vehicle | Apr. 14, 1987 |
| 4,941,365 | Reiner et al. | Device for Determining the Mass of a Motor Vehicle | Jul. 17, 1990 |

| U.S. Pat. No. | Inventor | Title | Issue Date |
| --- | --- | --- | --- |
| 5,215,154 | Kirby | Method and Apparatus for Measuring Vehicle Weight or Engine Power or Both | Jun. 1, 1993 |

Jonas U.S. Pat. No. 3,572,106 discloses an apparatus for measuring the torque on a rotating shaft. Klatt U.S. Pat. No. 4,548,079 discloses a method and apparatus to automatically determine the weight or mass of a moving vehicle; Fremd U.S. Pat. No. 4,656,876 discloses an apparatus for measuring the mass of a motor vehicle based on measurements on the transmission; Reiner U.S. Pat. No. 4,941,365 discloses a device for measuring vehicle weight in motion based on the running resistance of the vehicle with the clutch disengaged; and Kirby U.S. Pat. No. 5,215,154 discloses a method and apparatus for measuring vehicle weight or engine power or both.

The instant invention teaches improvements in the art of weighing vehicles in motion and departs from existing art. For example, Jonas U.S. Pat. No. 3,572,106 is broadly directed at measurement of torque, not mass. Jonas makes no attempt to determine rotational velocity nor acceleration.

Klatt U.S. Pat. No. 4,548,079 attempts to find vehicle weight from "one or two" measurements. The instant inventors have found that a single measurement, or a small number of such measurements are not sufficient, due to torque pulses from the engine and variations from other sources. Also, Klatt employs an input from the engine accelerator and/or fuel flow and applies this to a predetermined set of stored curves to determine engine torque. These curves represent a substantial source of error since actual torque will potentially vary with changes in temperature, fuel quality, friction, wear, and other engine performance parameters. The instant invention is an improvement in that it needs no such inputs nor corrections.

Fremd U.S. Pat. No. 4,656,876 determines vehicle mass by finding the natural frequency of oscillation in the vehicle transmission line. This frequency is largely influenced by vehicle suspension, shock absorbers, and tires, and is subject to substantial errors as these components wear or change due to temperature or other factors. The instant invention does not depend on the condition of these components and is based on a conceptually different approach.

Reiner U.S. Pat. No. 4,941,365 requires running resistance be determined with the clutch disengaged. The instant invention requires no such measurement, and will therefore function with either a manual transmission, or with an automatic transmission which might be equipped with a torque converter which exhibits no "clutch down" period. Reiner also relies on "an average value" of measurements, the instant invention teaches that the individual measurements yield greatly improved accuracy if combined in a new and unique vectorial manner.

Kirby U.S. Pat. No. 5,215,154 relies on a single measurement "at a constant rate of acceleration", and fails to account for many important (often non-linear) variables such as tire friction, wind, and roadway slope or condition. The present inventors realize the difficulty of maintaining a constant rate of acceleration, and recognize the need to integrate all the variables into each measurement. Furthermore, the present invention teaches the advantage of making a great number of measurements, each separated by a very brief period of time, rather than one or a small number of determinations, such as the single measurement taken over the 5 mph to 15 mph range in Kirby.

Thus, the above-listed patents are clearly distinguishable from the present invention, a description of which is set forth below. Before proceeding to that description, however, it should be noted and remembered that the description of the invention which follows, together with the accompanying drawings, should not be construed as limiting the invention to the examples (or preferred embodiments) shown and described. This is so because those skilled in the art to which the invention pertains will be able to devise other forms of this invention within the ambit of the appended claims.

II. SUMMARY OF THE INVENTION

The instant invention pertains generally to a system and method for determining the weight of a vehicle, such as a tractor-trailer combination, as well as the distribution or allotment of that gross weight among the various axles or tandems of the vehicle, from measurements made exclusively on the tractor. While the invention may be employed on vehicles such as straight or box trucks, it is especially useful when used in conjunction with a tractor-trailer combination, where said trailer exerts a load upon the fifth wheel of said tractor.

By means of one aspect of the present invention there has been provided a system for determining the gross weight of a loaded or unloaded tractor trailer combination while the vehicle is in motion. This weight may be used, for example, as input to the aspects of the invention described below in place of a conventional weighing to determine the gross vehicle weight. Newton's Second Law relates the acceleration that an object experiences through the application of a particular force to the mass of the object: $F=ma$, where F is the applied force, a is the resulting acceleration, and m is the mass of the object. As applied to a motor vehicle, it is possible to determine the gross weight (mass) of the vehicle using Newton's Second Law, provided that the force applied to the vehicle and its resulting acceleration are known or can be estimated. There are any number of ways to gather estimates of F and a from, for example, the engine or the drive train and many inventors have attempted to utilize this information. The present system differs from the prior art in the way the collected information is processed. In particular, the present invention involves the collection of a very large number of force and acceleration measurements at closely spaced time intervals. Within those short time intervals, certain external retarding forces such as wind resistance, terrain effects, and rolling fiction may be treated as being approximately constant. The numerous individual force and acceleration data pairs are then combined in a novel way to produce a determination of the vehicle weight. The computation involves modified vector addition of the force and acceleration data pairs.

By means of a second embodiment of this invention there has been provided a system and method for sensing the load distribution of a vehicle having an air bag suspension system located on the tractor. Air suspension devices (or air bags) are used on some tractors to support a portion of the load resting on the tractor. They are balloon type containers which are installed between the axles and the chassis, and take the place of metallic springs. When the tractor is unloaded, the air bag supports the chassis at the desired height with a relatively small amount of air pressure. As the tractor is loaded, for example by acquiring a trailer, air pressure supplied to the air bag is automatically increased to maintain the proper chassis height. Thus, the air bag carries the weight of the rear of the tractor and an additional load imposed by the trailer, the pressure inside the air bag being determined by the total trailer weight supported and the longitudinal position of the fifth wheel on the tractor. A sensor that detects air bag pressure can be calibrated to display or transmit the weight being supported by the air bag, as described by Perini et al. in U.S. Pat. No. 4,832,141.

By utilizing the aforementioned sensor on the tractor air bag, together with a device for detecting the longitudinal position of an adjustable fifth wheel on said tractor, a device for detecting the amount of fuel remaining in the fuel tank, and means for reading said devices, it is possible to determine the distribution of the tractor-trailer load on each axle or tandem of the vehicle, provided that the gross weight of said tractor-trailer combination, and certain other weight and length information relating to the unloaded and unfueled tractor is known. In particular, said weight and length information includes the known weight of the unloaded and unfueled tractor as measured by weighing only the front two wheels of said tractor, the known weight of the unloaded and unfueled tractor as measured by weighing the rear wheels of the tractor, the known weight supported by the air bag when the tractor is unloaded, the known distance from the center of the front axle of said tractor to the center of gravity of the fuel tank or tanks, and the known distance from the center of the front axle of said tractor to the midpoint between the rear axles of said tractor. By way of example only, the gross weight of the tractor-trailer combination might be either taken from the aforementioned weigh-in-motion embodiment or from a conventional weighing.

By means of a third embodiment of this invention there has been provided a system and method for sensing the load distribution of a vehicle that employs a fifth wheel. The fifth wheel of a tractor is used to couple the tractor to a trailer. It is generally mounted over the rear axle or axles of the tractor and not only provides a means for pulling the trailer along the road, but also is designed to transmit a portion of the weight of the attached trailer to the tractor frame. By placing a sensor in or adjacent to the fifth wheel, the portion of the trailer weight that rests on the fifth wheel can be detected. By way of example only, one invention that could be utilized to obtain the weight bearing on the fifth wheel may be found in U.S. Pat. No. 4,103,752, entitled "Fifth Wheel Scale Apparatus" and issued Aug. 1, 1978 to Schmidt et al.

By utilizing the aforementioned sensor on the tractor fifth wheel, together with a device for detecting the longitudinal position of an adjustable fifth wheel on the tractor, a device for detecting the amount of fuel remaining in the fuel tank, and means for reading said devices, it is possible to determine the distribution of the tractor-trailer load on each axle of the vehicle, provided that the gross weight of said tractor-trailer combination, and certain other weight and length information relating to the unloaded tractor, is known. In particular, the weight and length information could include the known weight of the unloaded and unfueled tractor as measured by weighing only the front two wheels of said tractor, the known weight of the unloaded and unfueled tractor as measured by weighing the rear wheels of the tractor, the known distance from the center of the front axle of said tractor to the center of gravity of the fuel tank or tanks, and the known distance from the center of the front axle of said tractor to the midpoint between the rear axles of said tractor. As before, the gross weight of the vehicle might come from either weigh-in-motion or a conventional weighing.

In the discussion that follows, the definitions are couched in terms of a common 18-wheel tractor-trailer combination. But, it is understood by those skilled in the art that the invention herein described could be applied to other axle arrangements and configurations as well.

IV. DETAILED DESCRIPTION OF THE PREFERRED EMBODIMENTS

Figure 1:
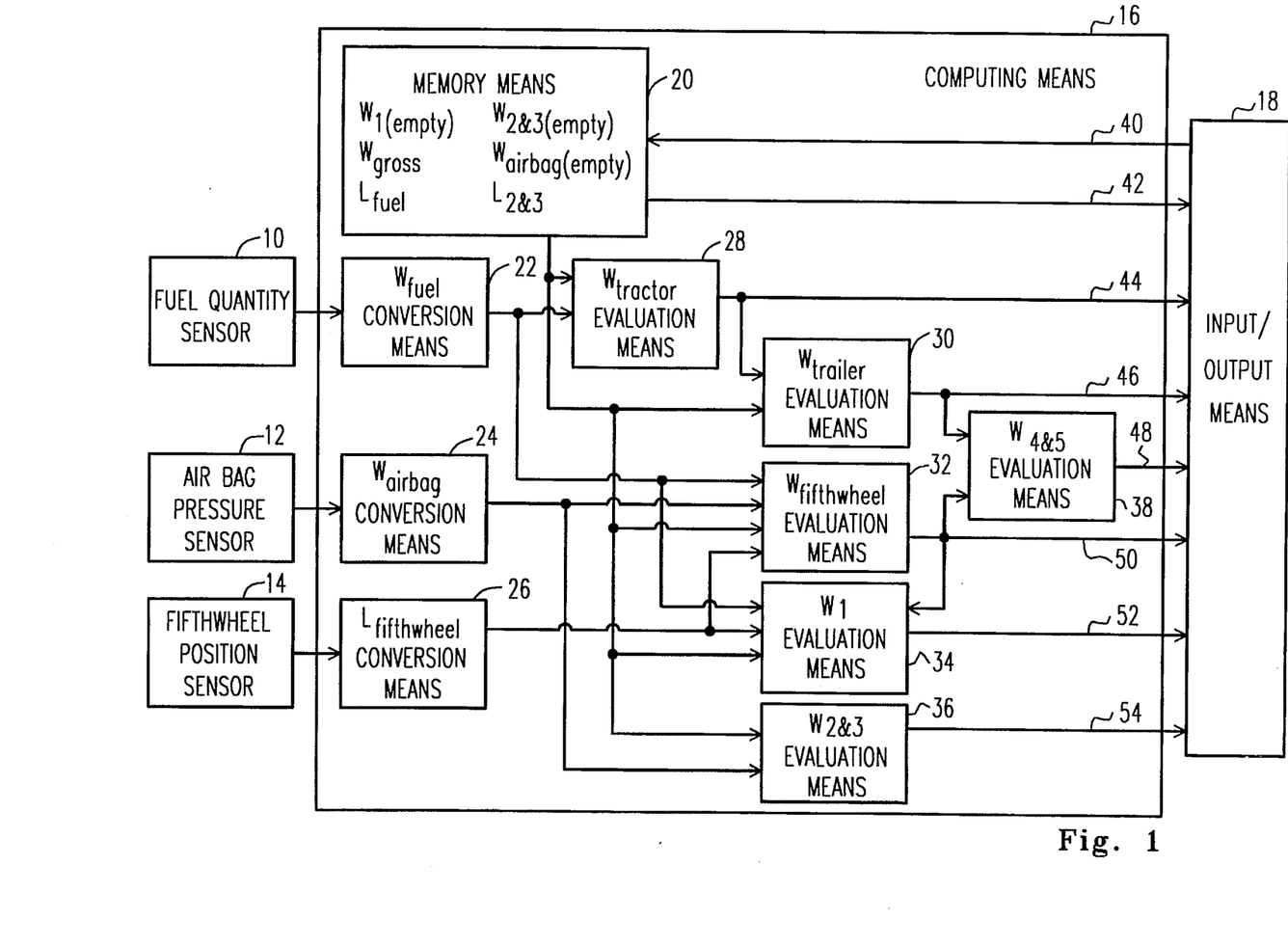
FIG. 1 is a schematic representation of the essential elements of a presently preferred embodiment of the instant invention wherein the load resting on the tractor air bag is detected and used to determine the weight resting on each axle or tandem of a tractor-trailer combination.

Referring to the drawings in detail, wherein like numerals denote identical elements throughout the several views, there is shown in FIG. 1 a schematic representation of a preferred embodiment of the present invention, wherein there is provided a system for evaluating the distribution of gross vehicle weight among the vehicle axles or tandems of a tractor or tractor-trailer combination wherein a first signal 10 relating to the quantity of fuel in the fuel tank or tanks of the tractor is detected; a second signal 12 related to the pressure in the air bag of the tractor is detected; and a third signal 14 related to the longitudinal position of a fifth wheel on the tractor is detected, said first, second, and third signals then being read by computing means 16. Said first signal is processed by conversion means 22 within the computing means to produce $W_{fuel}$, the weight of fuel in the tank or tanks of the tractor; said second signal is processed by conversion means 24 within said computing means to produce $W_{airbag}$, the weight resting on the air bag of the tractor; and, said third signal is processed by conversion means 26 within said computing means to produce $L_{fifthwheel}$, the longitudinal position of the fifth wheel on the tractor. There is also provided a memory means 20 within said computing means 16 wherein are stored various parameters that are needed in order to calculate the weight distribution of the tractor-trailer combination, including the known gross weight of the tractor-trailer combination, $W_{gross}$; the known weight of the tractor as measured at the front axle with no trailer and no fuel, $W_{1(empty)}$; the known weight of said empty tractor as weighed at the rear axle or axles, $W_{2\&3(empty)}$; the known weight of said empty tractor supported by said air bag, $W_{airbag(empty)}$; the known distance from the center of the front axle to the center of gravity of the fuel tank or tanks of the tractor, $L_{fuel}$; and the known distance from the center of the front axle of the tractor to the midpoint between the rear axles of the tractor, $L_{2\&3}$. In addition, said memory means 20 includes means for input 40 and output 42 of said parameters to input/output means 18 and means to provide said memory values to said computing means 16. The converted values, $W_{fuel}$, $W_{airbag}$, and $L_{fifthwheel}$, are processed within the computing means 16, together with the values from the memory means 20. The weight of the tractor, $W_{tractor}$, is determined within the evaluation means 28 from a knowledge of $W_{fuel}$, $W_{1(empty)}$ and $W_{2\&3(empty)}$. The weight of the attached trailer, $W_{trailer}$, is determined within the evaluation means 30 from a knowledge of $W_{tractor}$ and $W_{gross}$. The weight resting on the fifth wheel of the tractor, $W_{fifthwheel}$, is determined within the evaluation means 32 from a knowledge of $W_{airbag}$, $W_{airbag}$, $L_{fuel}$, $L_{2\&3}$, $W_{fuel}$, and $L_{fifthwheel}$. The weight resting on the front axle of the tractor, $W_1$, is determined within the evaluation means 34 from a knowledge of $W_{1(empty)}$, $L_{2\&3}$, $L_{fuel}$, $W_{fuel}$, $L_{fifthwheel}$, and $W_{fifthwheel}$. The weight resting on the rear axles or tandems of the tractor, $W_{2\&3}$, is determined within the evaluation means 36 from a knowledge of $W_{2\&3(empty)}$, $W_{airbag}$ and $W_{airbag(empty)}$. Finally, the weight resting on the axles or tandems of the trailer, $W_{4\&5}$, is determined within the evaluation means 38 from a knowledge of $W_{trailer}$ and $W_{fifthwheel}$. The computing means 16 then produces output signals 42, 44, 46, 48, 50, 52, and 54 which are supplied to said input/output means 18. The output from the computing means 16 includes a signal 44 representing $W_{tractor}$, a signal 46 representing $W_{trailer}$, a signal 48 representing $W_{4\&5}$, a signal 50 representing $W_{fifthwheel}$, a signal 52 representing the $W_1$, and a signal 54 representing $W_{2\&3}$.

The following quantities are among those that can be determined within the computing means from the sensor data. First, the weight of the empty tractor including the current level of fuel, $W_{tractor}$, is calculated within evaluation means 28 by summing together the weight of the fuel in the tank and the weights as measured at the front and rear axle or axles of the tractor:

$$W_{tractor} = W_{1(empty)} + W_{2\&3(empty)} + W_{fuel}.$$

Next, the weight of the trailer is calculated within evaluation means 30 by subtraction from the known gross weight of the entire tractor-trailer combination:

$$W_{trailer} = W_{gross} - W_{tractor}.$$

The weight bearing on the fifth wheel of the tractor is not measured directly in the present embodiment, but is calculated within evaluation means 32 from measured and known quantities. First, the difference $(W_{airbag} - W_{airbag(empty)})$ is a measure of the actual weight imposed by the trailer on the air bag. To this quantity must be added the proportion $(L_{fuel}/L_{2\&3})$ of the weight of the fuel currently in the tank, $W_{fuel}$, which is allocated to the rear axle of the tractor.

$$W_{fifthwheel} = \left( W_{airbag} - \left( W_{airbag(empty)} + \frac{L_{fuel}}{L_{2\&3}} W_{fuel} \right) \right) \left( \frac{L_{2\&3}}{L_{fifthwheel}} \right)$$

The quantities are now available to calculate the values of greatest interest, the weight bearing on each axle or tandem of the vehicle. First, the weight resting on the front axle of the tractor is determined within evaluation means 34 from a weighted combination of the load resting on the fifth wheel and the amount of fuel currently in the tank:

$$W_1 = W_{1(empty)} + \left( \frac{L_{2\&3} - L_{fuel}}{L_{2\&3}} \right) * W_{fuel} + \left( \frac{L_{2\&3} - L_{fifthwheel}}{L_{2\&3}} \right) * W_{fifthwheel}$$

Next, the weight resting on the rear axle or axles of the tractor is determined within evaluation means 36 and is given by $$W_{2\&3} = W_{2\&3(empty)} + W_{airbag} - W_{airbag(empty)},$$

since the load resting on the air bag is carried exclusively on the rear axles of the vehicle. Finally, the weight resting on the axle or axles of the trailer must include all of the trailer weight not resting on the fifth wheel and is determined within evaluation means 38 as follows:

$$W_{4\&5} = W_{trailer} - W_{fifthwheel}$$

Figure 2:
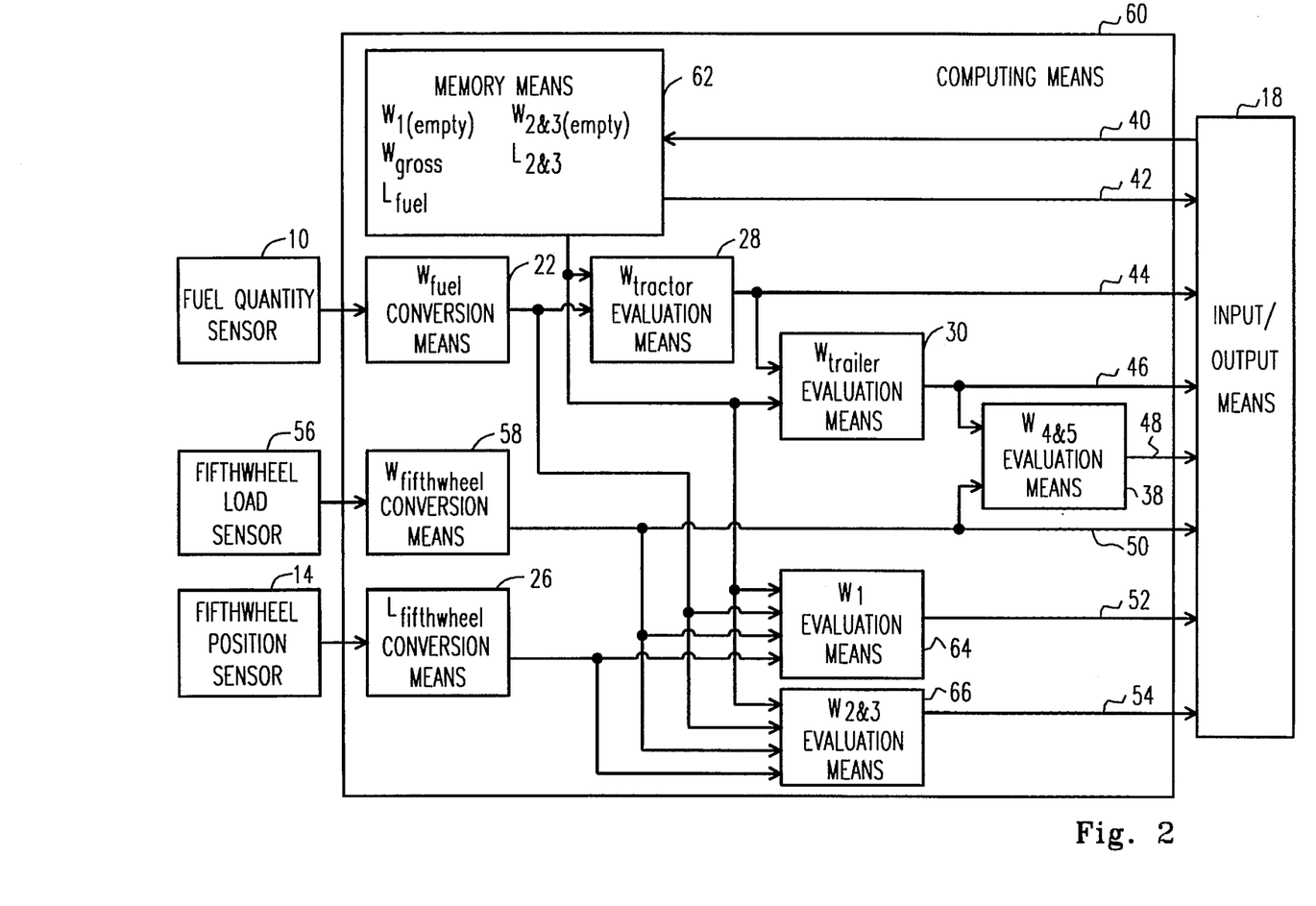
FIG. 2 is a schematic representation of the essential elements of another presently preferred embodiment of the instant invention wherein the load resting on the tractor fifth wheel is detected and used to determine the weight resting on each axle or tandem of a tractor-trailer combination.

According to a second aspect of the present invention, there is shown in FIG. 2 a schematic representation of a preferred embodiment of the present invention, wherein there is provided a system for evaluating the distribution of gross vehicle weight among the vehicle axles or tandems of a tractor or tractor-trailer combination wherein a first signal 10 related to the quantity of fuel in the tank or tanks of the tractor is detected; a second signal 56 relating to the force acting upon the fifth wheel of the tractor is detected; and a third signal 14 related to the longitudinal position of a fifth wheel on the tractor is detected, said first, second, and third signals then being read by computing means 60. Said first signal is processed by conversion means 22 within the computing means to produce $W_{fuel}$, the weight of fuel in the tank or tanks of the tractor; said second signal is processed by conversion means 58 within the computing means to produce $W_{fifthwheel}$, the weight resting on the fifth wheel of the tractor; and, said third signal is processed by conversion means 26 within the computing means to produce $L_{fifthwheel}$, the longitudinal position of the fifth wheel on the tractor. There is also provided a memory means 62 within the computing means 60 wherein are stored various parameters that are needed in order to calculate the weight distribution of the tractor-trailer combination, including the known gross weight of the tractor-trailer combination, $W_{gross}$; the known weight of the tractor as measured at the front axle with no trailer and no fuel, $W_{1(empty)}$; the known weight of said empty tractor as weighed at the rear axle or axles, $W_{2\&3(empty)}$; the known distance from the center of the front axle to the center of gravity of the fuel tank or tanks of the tractor, $L_{fuel}$; and the known distance from the center of the front axle of said tractor to the midpoint between the rear axles of the tractor, $L_{2\&3}$. In addition, the memory means 62 include means for input 40 and output 42 of said parameters to input/output means 18 and means to provide said parameters to the computing means 60. The converted values, $W_{fuel}$, $W_{fifthwheel}$, and $L_{fifthwheel}$, are processed within the computing means 60, together with the values from the memory means 62. The weight of the tractor, $W_{tractor}$, is determined within the evaluation means 28 from a knowledge of $W_{fuel}$, $W_{1(empty)}$ and $W_{2\&3(empty)}$. The weight of the attached trailer, $W_{trailer}$, is determined within the evaluation means 30 from a knowledge of $W_{tractor}$ and $W_{gross}$. The weight resting on the axles or tandems of the trailer, $W_{4\&5}$, is determined within the evaluation means 38 from a knowledge of $W_{trailer}$ and $W_{fifthwheel}$. The weight resting on the front axle of the tractor, $W_1$, is determined within the evaluation means 64 from a knowledge of $W_{1(empty)}$, $L_{2\&3}$, $L_{fuel}$, $W_{fuel}$, $L_{fifthwheel}$, and $W_{fifthwheel}$. The weight resting on the rear axles or tandems of the tractor, $W_{2\&3}$, is determined within the evaluation means 66 from a knowledge of $W_{2\&3(empty)}$, $W_{fuel}$, $L_{fuel}$, $L_{2\&3}$, $L_{fifthwheel}$, and $W_{fifthwheel}$. The computing means 60 then produces output signals 42, 44, 46, 48, 50, 52 and 54 which are supplied to the input/output means 18. The output from the computing means 16 includes a signal 44 representing $W_{tractor}$, a signal 46 representing $W_{trailer}$, a signal 48 representing $W_{4\&5}$ a signal 50 representing $W_{fifthwheel}$, a signal 52 representing $W_1$, and a signal 54 representing $W_{2\&3}$.

The following quantities are among those that can be calculated from the sensor data within the computing means. First, the weight of the empty tractor including the current level of fuel, $W_{tractor}$, may be calculated within evaluation means 28 by summing together the weight of the fuel in the tank or tanks and the weights as measured at the front and rear axle or axles of the empty tractor:

$$W_{tractor} = W_{1(empty)} + W_{2\&3(empty)} + W_{fuel}.$$

Next, the weight of the trailer is calculated within evaluation means 30 by subtraction from the known gross weight of the entire tractor-trailer combination:

$$W_{trailer} = W_{gross} - W_{tractor}$$

The data are now available to calculate the quantities of greatest interest, the weight bearing on each axle or tandem of the vehicle. First, the weight resting on the front axle of the tractor is determined within evaluation means 64 and consists of three components: the weight registered by the unloaded front axle; the proportion of the fuel weight that is carried by the front axle; and some proportion of the weight which rests on the fifth wheel, said proportion depending on the longitudinal position of the fifth wheel.

$$W_1 = W_{1(empty)} + \left(\frac{L_{2\&3} - L_{fuel}}{L_{2\&3}}\right) * W_{fuel} + \left(\frac{L_{2\&3} - L_{fifthwheel}}{L_{2\&3}}\right) * W_{fifthwheel}$$

Next, the weight resting on the rear axle or axles of the tractor is determined within the evaluation means 66 and may be expressed as a weighted combination of the following quantities:

$$W_{2\&3} = W_{2\&3(empty)} + \left(\frac{L_{fuel}}{L_{2\&3}}\right) * W_{fuel} + \left(\frac{L_{fifthwheel}}{L_{2\&3}}\right) * W_{fifthwheel}.$$

Finally, the weight resting on the axle or axles of the trailer must account for all of the trailer weight not resting on the fifth wheel and is determined within the evaluation means 38 as follows:

$$W_{4\&5} = W_{trailer} - W_{fifthwheel}$$

The present inventors have realized that, in said first and second aspects of the invention, a nominal fuel quantity can be substituted for the measured fuel quantity, $W_{fuel}$, to yield an estimate of the weight distribution of the vehicle. This nominal quantity might be, for example, a constant that is equal to the weight of the tank or tanks when they are half full. This substitution, though, will result in an accompanying decrease in the accuracy of the weight distribution calculations.

Figure 3:
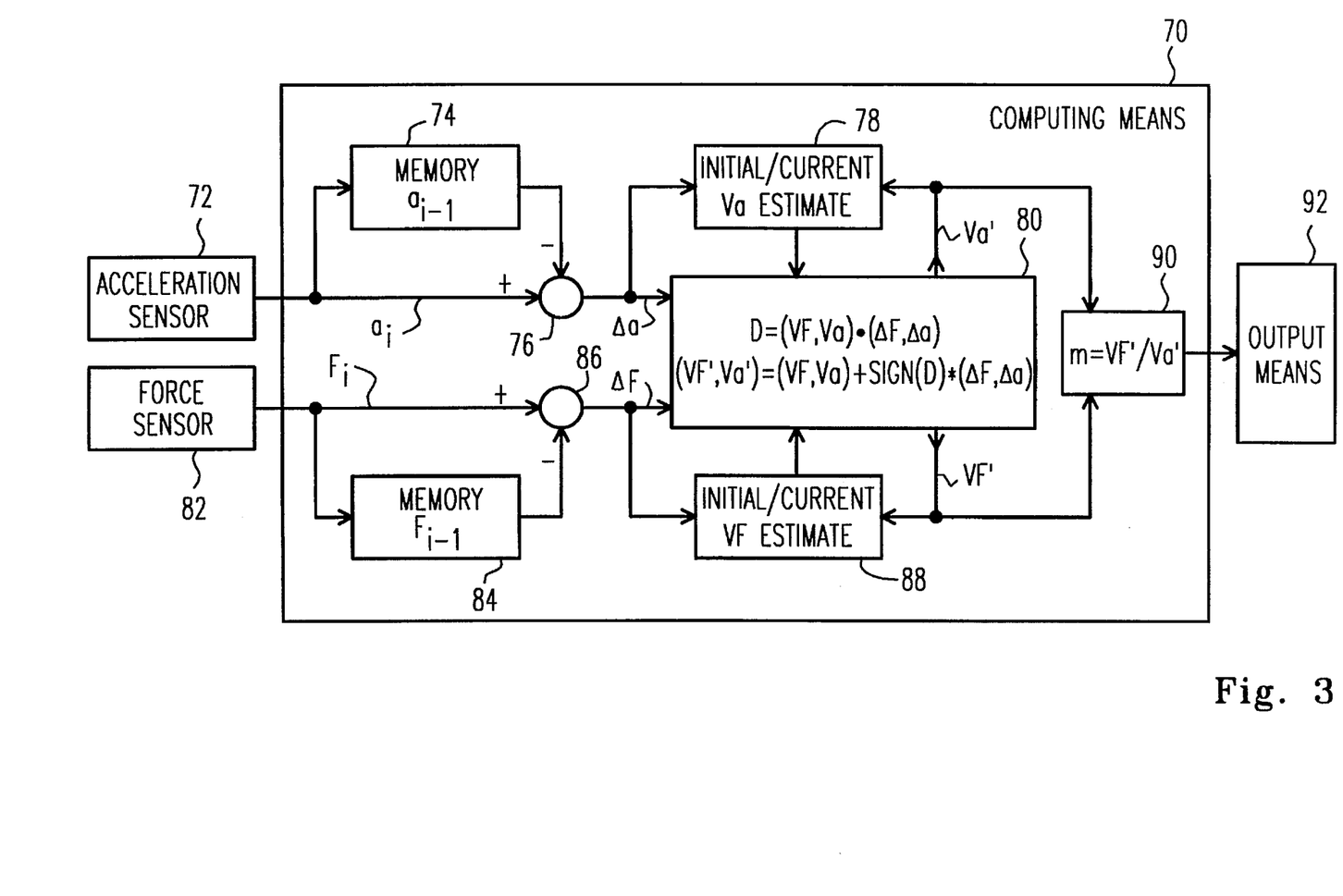
FIG. 3 is a schematic representation of the essential elements of another presently preferred embodiment of the instant invention wherein information from force and acceleration sensors are used to determine the gross weight of the vehicle.

According to a third aspect of the present invention, there is shown in FIG. 3 a schematic representation of another preferred embodiment of the present invention, wherein there is provided a system for measuring the gross weight of a vehicle in which said gross weight is determined automatically in motion from measurements of force and acceleration taken from, for example, the engine or drive train of said tractor. Said gross weight might be used, for example, with the previous two embodiments to determine the weight distribution among the vehicle axles or tandems of a tractor-trailer combination.

More specifically, force and acceleration are related to mass through Newton's second law, F=ma, where F is the force, m is the mass and a the corresponding acceleration. In particular, the mass of an object may be determined experimentally by applying a force to an object and measuring its resulting acceleration. Thus, the form of the equation most useful for the present invention is m=F/a.

In the situation under consideration here, it is more realistic to consider Newton's second law in an expanded form:

$$ma = F_t - F_{friction} \pm F_{wind} \pm F_{terrain} + \ldots$$

so that $$F_t = ma + (F_{friction} \pm F_{wind} \pm F_{terrain} + \ldots)$$

where $F_t$ is the force necessary to move the truck and its current load and is taken preferably, but not exclusively, from the engine or drive train. The force could be engine "torque," but alternative measures of engine effort might also be used, including, but not limited to, instantaneous horsepower, or manifold pressure. $F_{friction}$ represents a composite of all retarding forces due to friction, $F_{wind}$ is the resistance or acceleration due to wind, and $F_{terrain}$ represents the tendency of the slope or gradient of the terrain to retard or accelerate the vehicle. More simply, this expression can be represented as:

$$F_t = ma + F_{other},$$

or, more appropriately for these purposes:

$$a = (1/m) * F_{torque} + (1/m) * F_{other},$$

Now, under the (not too unreasonable) assumption that $F_{other}$, and hence $(1/m)*F_{other}$, is relatively constant over a very short time span, it follows that a plot of $F_t$ (as the "X" axis) against a (as the "Y" axis) will result in a display which, if properly scaled, will have as its slope 1/m, the inverse of the current vehicle weight, i.e.:

$$a = (1/m) * F_t + C,$$

where C represents quantities that can taken to be constant over a short time period. Call the time-successive force measurements $F_i$ and accelerations measured during the same time periods, $a_i$.

The raw data used in the weight computation procedure consist of the series of successive data pairs, $a_i$ and $F_i$, at least one data pair being generated each second in the preferred embodiment. The vehicle acceleration could come from any number of sources, for example: a sensor attached to the speedometer, counts of engine revolutions per second (given the circumference of the tires and the transmission ratio), or counts of drive shaft revolutions per second (given the circumference of the tires). If it is more practical to obtain the velocities instead of the accelerations, the acceleration may be obtained from the velocity by calculating the numerical derivative of successive velocity determinations.

A primary quantity of interest to the present invention is the slope of the curve on the force versus acceleration plot. Of course, since a great number of points may be accumulated during a measurement cycle, a method has been provided for combining those multiple values to produce a single weight determination.

The gross weight of the vehicle is related to said measured force and acceleration values in the following fashion. It is known to those skilled in the art that the slope of the line segment between two successive force-acceleration pairs:

$$s_i = \frac{a_i - a_{i-1}}{F_i - F_{i-1}},$$

where $s_i$ is the slope at the ith time period, is inversely related through Newton's second law to the weight of the vehicle. That is, each $s_i$ provides an estimate of the gross weight of the vehicle:

$$m_i = \frac{1}{s_i},$$

where $m_i$ is an estimate of the gross weight of the vehicle obtained from data collected during the ith time period.

Conventional wisdom would suggest that the best method of combining said $m_i$ values into a single estimate of the weight of the vehicle would be to average them, or apply some other univariate estimate of location, and certainly that could be utilized in the present invention. The experience of the present inventors has shown, though, that these approaches produce unsatisfactory answers. Rather, the present invention teaches that the preferred method of combining the numerous individual values into a single composite estimate is best performed as summarized in FIG. 3 and as described below.

Let (VF, VA) represent a vector whose slope represents the current estimate of the inverse of the weight of the vehicle and whose elements are the current composite estimates of the acceleration and force. Let $(F_i, a_i)$ be a point composed of the ith acceleration and force measurements which are next to be integrated into said composite estimate, let $(F_{i-1}, a_{i-1})$ be the point composed of the previous time period's, i.e., the i-1st period, force and acceleration measurements, and let (ΔF, Δa) be the vector that represents the difference:

$$(\Delta F, \Delta a) = (F_i - F_{i-1}, a_i - a_{j-1}).$$

In order to augment the current force and velocity estimates with (ΔF, Δa), the following procedure is suggested. Let D be the vector dot product ("•") between (VF, VA) and (ΔF, Δa):

$$D = (VF, VA) \cdot (\Delta F, \Delta a)$$
$$= VF * \Delta F + VA * \Delta a.$$

If D is greater than zero, the updated vector estimate, (VF', VA'), is given by:

$$(VF', VA') = (VF, VA) \cdot (\Delta F, \Delta a)$$
$$= (VF + \Delta F, VA + \Delta a).$$

If D is less than or equal to zero, the updated vector estimate, (VF', VA'), is given by:

$$(VF', VA') = (VF, VA) - (\Delta F, \Delta a)$$
$$= (VF - \Delta F, VA - \Delta a),$$

wherein the mathematical negative of the original vector (ΔF, Δa) is added to (VF, VA).

More simply, this equation can be written as:

$$(VF', VA') = (VF, VA) + (SIGN(D)) * (\Delta F, \Delta a),$$

where SIGN(D) is a function whose value is −1 if D is positive, and −1 if D is negative. Finally, the gross weight of the vehicle is calculated by determining the slope of the composite vector (VF', VA'):

$$\text{Gross Vehicle Weight} = \frac{VF'}{VA'}.$$

Referring now to FIG. 3, said figure contains a first signal 72 representing acceleration, $a_i$; a second signal 82 representing the force applied to the vehicle, $F_i$; a computing means 70; and an output means 92. Within said computing means 70 are means for determining gross vehicle weight, $W_{gross}$, including memory means 74 which serves to store $a_{i-1}$, the most recent acceleration sample taken prior to the present sample; memory means 84 to store the force sample $F_{i-1}$ taken simultaneously with said $a_{i-1}$; differencing means 76 to determine the difference between said present and said most recent samples of acceleration, Δa; differencing means 86 to determine the difference between said present and said most recent samples of force, ΔF; memory means 78 to store the initial or current estimate of Va; memory means 88 to store the initial or current estimate of VF; calculating means 80 to solve the equations:

$$D = (VF, Va) \cdot (\Delta F, \Delta a)$$

$$(VF', Va') = (VF, Va) + SIGN(D) * (\Delta F, \Delta a);$$

and calculating means 90 to evaluate the ratio VF'/Va'. Said output means 92 serves to link the gross weight signal to, for purposes of example only, said memory means 20 as illustrated in FIG. 1.

The rationale for this method of computation is that a vector (ΔF, Δa) will only be added to the current estimate (VF, VA) if it extends the length of the latter vector. Viewed graphically, if the dot product is positive, that signifies that the angle between (ΔF, Δa) and (VF, VA) is bounded by plus and minus 90 degrees. If the dot product is negative, then the angle between the two vectors is greater than 90 or less than −90 degrees. The net effect is to only add vectors to the composite estimate that are pointing in the same general direction as the current vector estimate.

According to a fourth aspect of the present invention there is provided a method for determining the gross weight of a vehicle in which only one sensor is employed to simultaneously sense acceleration and force. Said gross weight might be used, for example, with the first two embodiments to determine the weight distribution among the vehicle axles or tandems of a tractor-trailer combination. For purposes of illustration, the following description is couched in terms of a vehicle drive shaft, but it is to be remembered that one skilled in the art could employ the same method within an engine or transmission or elsewhere within a vehicle. Likewise, the description is couched in magnetic terms, but it will be remembered that the same object can be accomplished by photoelectric or other means.

The present inventors have realized that conventional on-board weighing devices such as load cells and force transducers are analog in nature, and therefore have disadvantageous characteristics such as temperature drift, nonlinearity, long term instability, and high cost. A principal feature of said fourth aspect is the use of a single low cost digital sensor that is not subject to these disadvantages. In the preferred embodiment, a sheath similar to that taught by Jonas in U.S. Pat. No. 3,572,106 is placed over the tractor drive shaft, but other arrangements are certainly possible. Said sheath is not load bearing and is attached to the drive shaft at one end only, the unattached end being formed to produce a flange supporting a ring with a plurality of magnets spaced substantially equally about its inner perimeter. Within said ring is a second (inner) ring with a like number of magnets. Said second ring is of smaller diameter and is attached directly to the drive shaft at a position that is coplanar with the first ring, and with its magnets substantially equidistant from the magnets on said outer ring. The two rings could also be of equal diameter and positioned parallel and adjacent to one another.

The magnets of said outer ring are positioned such that their north magnetic poles are aligned in the same direction. For purposes of specificity, assume that their north poles all face in a clockwise direction. The magnets of said inner ring are positioned in opposition, in this instance with all north poles facing counter-clockwise. In the preferred embodiment, the size of the magnets is small in comparison with the inter-magnet spacing. In operation, torque (force) transmitted through the drive shaft causes a torsional deflection of said shaft, resulting in a change in inter-magnet spacing.

A single sensor, properly positioned and located on the vehicle, senses the magnetic field from both rings as the drive shaft rotates. By way of illustration, a preferred embodiment uses a bistable Hall effect device as a sensor. A bistable Hall device remains in one state until the opposite magnetic polarity is sensed, at which time it switches to its other state. A square wave output is produced in which the number of cycles per drive shaft revolution equals the number of magnet pairs, thus the frequency is proportional to vehicle velocity. Further, the duty factor, or time ratio of positive phase to negative phase of each square wave, is a measure of the relative phase of the inner-ring magnets to the outer-ring magnets, and thus, is ultimately a measure of the torque being transmitted through said drive shaft. It is therefore possible and advantageous to derive force and acceleration simultaneously from this one digital signal.

Figure 4:
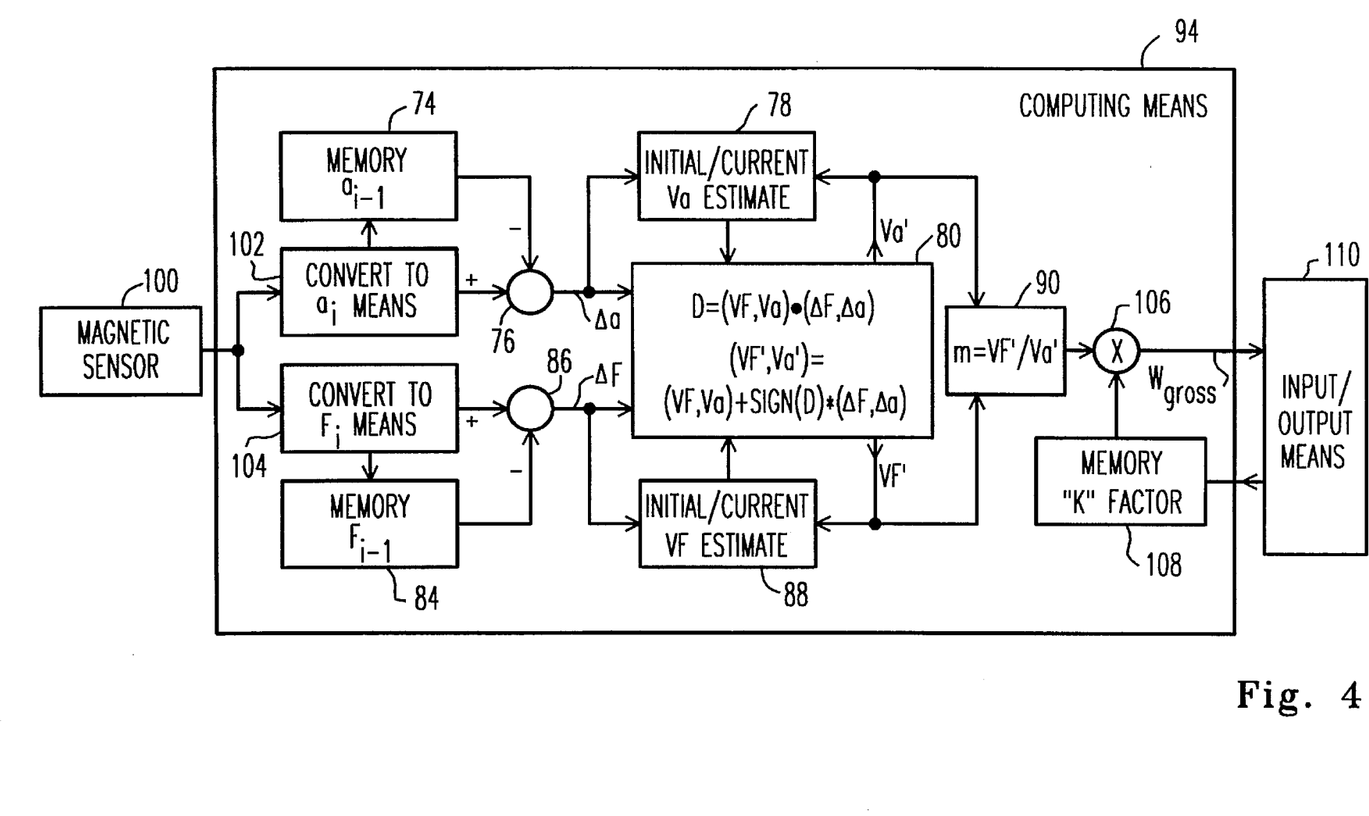
FIG. 4 is a schematic representation of the essential elements of another presently preferred embodiment of the instant invention wherein information from a single sensor on the drive shaft is used to determine the gross weight of the vehicle.

Referring now to FIG. 4, said figure contains a magnetic sensor 100 connected electronically to a computing means 94, which in turn is connected to an input/output means 110. Within said computing means 94 are means for determining gross vehicle weight, $W_{gross}$, including means 102 to convert the frequency of the signal from the magnetic sensor 100 into vehicle acceleration, $a_i$; means 104 to convert the duty factor of the signal from the magnetic sensor 100 into force, $F_i$; memory means 74 to temporarily store the acceleration determination at the most recent previous time period, $a_{i-1}$; memory means 84 to temporarily store the force determination at the most recent previous time period, $F_{i-1}$, said previous time period force taken simultaneously with said previous acceleration measurement, $a_{i-1}$; differencing means 76 to calculate the difference between said present and said most recent samples of acceleration, $\Delta a$; differencing means 86 to determine the difference between said present and said most recent samples of force, $\Delta F$; memory means 78 to store the initial or current estimate of Va, the composite estimate of the vehicle acceleration; memory means 88 to store the initial or current estimate of VF, the composite estimate of the force applied to the vehicle; calculating means 80 to solve the equations:

$$D=(VF,Va)\cdot(\Delta F, \Delta a)$$

$$(VF', Va')=(VF,Va)+\text{SIGN}(D)*(\Delta F, \Delta a);$$

and calculating means 90 to calculate the ratio VF'/Va'. Also included in computing means 94 is memory means 108 to store a calibrating factor, K; and multiplying means 106 to combine the ratio VF'/Na' with the K factor to produce the gross vehicle weight, $W_{gross}$. Said input/output means 110 serves as a way to enter the K factor into the system. It also can serve as a link, for example, to the memory means 20 of FIG. 1, in which the gross vehicle weight is stored for purposes of determining the weight distribution of the vehicle.

The force and acceleration measurements used in the present embodiment are taken from the torque applied to, and speed of, the drive train. The calibration factor K is empirically determined, and is related to physical characteristics of the drive train such as stiffness, number of magnet pairs, gear ratio between the drive train and axles, tire circumference, and other factors.

While the inventive device has been described and illustrated herein by reference to certain preferred embodiments in relation to the drawings attached hereto, various changes and further modifications, apart from those shown or suggested herein, may be made therein by those skilled in the art, without departing from the spirit of the inventive concept, the scope of which is to be determined by the following claims.

What is claimed is:

1. A method for determining the weight distribution on the axles of a motor vehicle and generating values corresponding to said respective axle weights of said motor vehicle, said method comprising the steps of:

(a) generating by first sensing means a first signal value corresponding to the weight resting on the tractor air bag;

(b) generating by second sensing means a second signal value corresponding to the weight of fuel in the tractor fuel tank;

(c) generating by third sensing means a third signal value corresponding to the longitudinal position of the fifth wheel on the tractor in relation to the center of the front axle of said tractor;

(d) evaluating by a computing means the weight of the tractor trailer combination resting on the front axle of the tractor from said signal values and one or more constant values;

(e) evaluating by computing means the weight resting on the rear axle or axles of the tractor from values of said signals and one or more constant values; and (f) evaluating by computing means the weight resting on the axles of the trailer from values of said signals and one or more constant values.

2. A method for determining the weight distribution on the axles of a motor vehicle and generating values corresponding to said respective axle weights of said motor vehicle wherein a force acting on a tractor air bag is detected, said method comprising the steps of:

(a) generating by first sensing means a first signal corresponding to the weight resting on the tractor air bag;

(b) generating by second sensing means a second signal corresponding to the weight of fuel in the tractor fuel tank or tanks;

(c) generating by third sensing means a third signal corresponding to the longitudinal position of the fifth wheel on the tractor in relation to the center of the front axle of said tractor;

(d) transmitting said signals in steps (a), (b), and (c) to a computing means which includes a memory means;

(e) recalling from the memory means a gross weight of the tractor-trailer combination, the weight resting on the front axles of the tractor in an unloaded and unfueled state, the weight resting on the rear axle or axles of the tractor in an unloaded and unfueled state, the weight resting on the tractor air bag when the tractor is in an unloaded and unfueled state, the distance from the center of the front axle of the tractor to the center of gravity of the fuel tank or tanks, and the distance from the center of the front axle of the tractor to the center of the rear axle or axles of the tractor;

(f) evaluating by computing means the weight resting on the front axle of the tractor from said transmitted signals and said values recalled from the memory means;

(g) evaluating by computing means the weight resting on the rear axle or axles of the tractor from said signal values and said values recalled from the memory means;

(h) evaluating by computing means the weight resting on the axles of the trailer from said signal values and said values recalled from the memory means;

(i) generating by computing means weight signals corresponding to said values of said weights calculated in steps (f), (g), and (h); and (j) transmitting said weight signals to a means for utilizing said weight signals.

3. A method, according to claim 2, wherein the step of evaluating by computing means the weight resting on the front axle of the tractor from said signal values and said values recalled from the memory means includes the step of solving by computing means the equations $$W_{fifthwheel} = \left( W_{airbag} - \left( W_{airbag(empty)} + \frac{L_{fuel}}{L_{2\&3}} W_{fuel} \right) \right) \left( \frac{L_{2\&3}}{L_{fifthwheel}} \right)$$

$$W_1 = W_{1(empty)} + \left( \frac{L_{2\&3} - L_{fuel}}{L_{2\&3}} \right) W_{fuel} + \left( \frac{L_{2\&3} - L_{fifthwheel}}{L_{2\&3}} \right) W_{fifthwheel}$$

for $W_1$, wherein $W_1$=the weight resting on the front axle of the tractor, $W_{fifthwheel}$=the weight resting on the fifth wheel of the tractor, $W_{airbag}$=the weight resting on the air bag of the tractor, $W_{airbag(empty)}$=the known weight resting on the air bag of the tractor with no trailer and no fuel, $L_{fuel}$=the known distance from the center of the front axle to the center of gravity of the fuel tank or tanks of the tractor, $L_{2\&3}$=the known distance from the center of the front axle of the tractor to the midpoint between the rear axles of the tractor, $W_{fuel}$=the weight of fuel in the tank or tanks of the tractor, $L_{fifthwheel}$=the longitudinal position of the fifth wheel on the tractor, and $W_{1(empty)}$=the known weight of the tractor as measured at the front axle with no trailer and no fuel.

4. A method, according to claim 2, wherein the step of evaluating by computing means the weight resting on the rear axle or axles of the tractor from said signal values and said values recalled from the memory means includes the step of solving by computing means the equation $$W_{2\&3} = W_{2\&3(empty)} + W_{airbag} - W_{airbag(empty)}$$

for $W_{2\&3}$, wherein $W_{2\&3}$=the weight resting on the rear axles or tandems of the tractor, $W_{2\&3(empty)}$=the known weight of the tractor as measured at the rear axle or axles with no trailer and no fuel, $W_{airbag}$=the weight resting on the air bag of the tractor, and $W_{airbag(empty)}$=the known weight resting on the air bag of the tractor with no trailer and no fuel.

5. A method, according to claim 2, wherein the step of evaluating by computing means the weight resting on the axles of the trailer from said signal values and said values recalled from the memory means includes the step of solving by computing means the equations $$W_{fifthwheel} = \left( W_{airbag} - \left( W_{airbag(empty)} + \frac{L_{fuel}}{L_{2\&3}} W_{fuel} \right) \right) \left( \frac{L_{2\&3}}{L_{fifthwheel}} \right)$$

$$W_{tractor} = W_{1(empty)} + W_{2\&3(empty)} + W_{fuel}$$

$$W_{trailer} = W_{gross} - W_{tractor}$$

$$W_{4\&5} = W_{trailer} - W_{fifthwheel}$$

for $W_{4\&5}$, wherein $W_{4\&5}$=the weight resting on the axles or tandems of the trailer, $W_{fifthwheel}$=the weight resting on the fifth wheel of the tractor, $W_{airbag}$=the weight resting on the air bag of the tractor, $W_{airbag(empty)}$=the known weight resting on the air bag of the tractor with no trailer and no fuel, $L_{fuel}$=the known distance from the center of the front axle to the center of gravity of the fuel tank or tanks of the tractor, $L_{2\&3}$=the known distance from the center of the front axle of the tractor to the midpoint between the rear axles of the tractor, $W_{fuel}$=the weight of fuel in the tank or tanks of the tractor, $L_{fifthwheel}$=the longitudinal position of the fifth wheel on the tractor, $W_{tractor}$=the weight of the tractor, $W_{1(empty)}$=the known weight of the tractor as measured at the front axle with no trailer and no fuel, $W_{2\&3(empty)}$=the known weight of the tractor as measured at the rear axle or axles with no trailer and no fuel, $W_{trailer}$=the weight of the attached trailer, and $W_{gross}$=the known gross weight of the tractor-trailer combination.

6. A method, according to claim 2, wherein the gross weight of the vehicle is obtained by:

(a) generating by sensing means a first acceleration signal at a first point in time and storing said acceleration signal into a memory means within a computing means;

(b) generating by sensing means a first force signal at a first point in time and storing said force signal into the memory means;

(c) generating by sensing means a second acceleration signal at a second point in time and storing said acceleration signal into the memory means, said second point in time being less than one second after said first point in time;

(d) generating by sensing means a second force signal at a second point in time and storing said force signal into the memory means, said second point in time being less than one second after said first point in time;

(e) generating by sensing means a third acceleration signal at a third point in time and storing said acceleration signal into the memory means, said third point in time being less than one second after said second point in time;

(f) generating by sensing means a third force signal at a third point in time and storing said force signal into the memory means, said third point in time being less than one second after said second point in time;

(g) determining and storing a first difference in value between said first and second acceleration signals;

(h) determining by computing means and storing a first difference in value between said first and second force signals;

(i) determining by computing means and storing a second difference in value between said second and third acceleration signals;

(j) determining by computing means and storing a second difference in value between said second and third force signals;

(k) calculating by computing means the gross weight of said vehicle using the differences calculated in steps (g) through (j); and (l) storing said gross weight into the memory means.

7. A method for determining the weight distribution on the axles of a motor vehicle and generating values corresponding to the respective axle weights of the motor vehicle, said method comprising the steps of:

(a) generating by first sensing means a first signal value corresponding to the weight resting on the tractor fifth wheel;

(b) generating by second sensing means a second sisal value corresponding to the weight of fuel in the tractor fuel tank;

(c) generating third sensing means, a third signal value corresponding to the longitudinal position of the fifth wheel on the tractor in relation to the center of the front axle of said tractor;

(d) evaluating by a computing means the weight of the tractor trailer combination resting on the front axle of the tractor from said signal values and one or more constant values;

(e) evaluating by computing means the weight resting on the rear axle or axles of the tractor from said signal values and one or more constant values;

(f) evaluating by computing means the weight resting on the axles of the trailer from said signal values and one or more constant values.

8. A method for determining the weight distribution on the axles of a motor vehicle and generating values corresponding to the respective axle weights of the motor vehicle wherein a force acting on a tractor fifth wheel is detected, said method comprising the steps of:

(a) generating by first sensing means a first signal corresponding to the weight resting on the tractor fifth wheel;

(b) generating by second sensing means a second signal corresponding to the weight of fuel in the tractor fuel tank or tanks;

(c) generating by third sensing means a third signal corresponding to the longitudinal position of the fifth wheel on the tractor in relation to the center of the front axle of said tractor;

(d) transmitting said signals in steps (a), (b), and (c) to a computing means which includes a memory means;

(e) recalling from the memory means a gross weight of the tractor-trailer combination, the weight resting on the front axles of the tractor in an unloaded and unfueled state, the weight resting on the mar axle or axles of the tractor in an unloaded and unfueled state, the distance from the center of the front axle of the tractor to the center of gravity of the fuel tank or tanks, and the distance from the center of the front axle of the tractor to the center of the rear axle or axles of the tractor;

(f) evaluating by computing means the weight resting on the front axle of the tractor from said transmitted signals and said values recalled from the memory means;

(g) evaluating by computing means the weight resting on the rear axle or axles of the tractor from said signal values and said values recalled from the memory means;

(h) evaluating by computing means the weight resting on the axles of the trailer from said signal values and said values stored in the memory means; and (i) generating weight signals corresponding to said values of said weights calculated in steps (f), (g), and (h).

9. A method, according to claim 8, wherein the step of evaluating by computing means the weight resting on the front axle of the tractor from said signal values and said values recalled from the memory means includes the step of solving by computing means the equation $$W_1 = W_{1(empty)} + \left( \frac{L_{2\&3} - L_{fuel}}{L_{2\&3}} \right) W_{fuel} + \left( \frac{L_{2\&3} - L_{fifthwheel}}{L_{2\&3}} \right) W_{fifthwheel}$$

for $W_1$, wherein $W_1$=the weight resting on the front axle of the tractor, $W_{1(empty)}$=the known weight of the tractor as measured at the front axle with no trailer and no fuel, $L_{2\&3}$=the known distance from the center of the front axle of the tractor to the midpoint between the rear axles of the tractor.

$L_{fuel}$=the known distance from the center of the front axle to the center of gravity of the fuel tank or tanks of the tractor, $W_{fuel}$=the weight of fuel in the tank or tanks of the tractor, $L_{fifthwheel}$=the longitudinal position of the fifth wheel on the tractor, and $W_{fifthwheel}$=the weight resting on the fifth wheel of the tractor.

10. A method, according to claim 8, wherein the step of evaluating by computing means the weight resting on the rear axle or axles of the tractor from said signal values and said values recalled from the memory means includes the step of solving by computing means the equation $$W_{2\&3} = W_{2\&3(empty)} + \left(\frac{L_{fuel}}{L_{2\&3}}\right) W_{fuel} + \left(\frac{L_{fifthwheel}}{L_{2\&3}}\right) W_{fifthwheel}$$

for $W_{2\&3}$, wherein $W_{2\&3}$=the weight resting on the rear axles or tandems of the tractor, $W_{2\&3(empty)}$=the known weight of the tractor as measured at the rear axle or axles with no trailer and no fuel, $L_{fuel}$=the known distance from the center of the front axle to the center of gravity of the fuel tank or tanks of the tractor, $L_{2\&3}$=the known distance from the center of the front axle of the tractor to the midpoint between the rear axles of the tractor, $W_{fuel}$=the weight of fuel in the tank or tanks of the tractor, $L_{fifthwheel}$=the longitudinal position of the fifth wheel on the tractor, and $W_{fifthwheel}$=the weight resting on the fifth wheel of the tractor.

11. A method, according to claim 8, wherein the step of evaluating by computing means the weight resting on the axles of the trailer from said signal values and said values stored in the memory means includes the step of solving by computing means the equations $W_{tractor} = W_{1(empty)} + W_{2\&3(empty)} + W_{fuel}$ $W_{trailer} = W_{gross} - W_{tractor}$, $W_{4\&5} = W_{trailer} - W_{fifthwheel}$ for $W_{4\&5}$, wherein $W_{4\&5}$=the weight resting on the axles or tandems of the trailer, $W_{tractor}$=the weight of the tractor, $W_{1(empty)}$=the known weight of the tractor as measured at the front axle with no trailer and no fuel, $W_{2\&3(empty)}$=the known weight of the tractor as measured at the rear axle or axles with no trailer and no fuel, $W_{fuel}$=the weight of fuel in the tank or tanks of the tractor, $W_{trailor}$=the weight of the tractor, and $W_{gross}$=the known gross weight of the tractor-trailer combination, $W_{tractor}$=the weight of the tractor, and $W_{fifthwheel}$=the weight resting on the fifth wheel of the tractor.

12. A method, according to claim 8, wherein the gross weight of the vehicle is obtained by:

(a) generating by sensing means a first acceleration signal at a first point in time and storing said acceleration signal into a memory means within a computing means;

(b) generating by sensing means a first force signal at a first point in time and storing said force signal into the memory means;

(c) generating by sensing means a second acceleration signal at a second point in time and storing said acceleration signal into the memory means, said second point in time being less than one second after said first point in time;

(d) generating by sensing means a second force signal at a second point in time and storing said force signal into the memory means, said second point in time being less than one second after said first point in time;

(e) generating by sensing means a third acceleration signal at a third point in time and storing said acceleration signal into the memory means, said third point in time being less than one second after said second point in time;

(f) generating by sensing means a third force signal at a third point in time and storing said force signal into the memory means, said third point in time being less than one second after said second point in time;

(g) determining by computing means and storing a first difference in value between said first and second acceleration signals;

(h) determining by computing means and storing a first difference in value between said first and second force signals;

(i) determining by computing means and storing a second difference in value between said second and third acceleration signals;

(j) determining by computing means and storing a second difference in value between said second and third force signals;

(k) calculating by computing means the gross weight of said vehicle using the differences calculated in steps (g) through (j); and (l) storing said gross weight into memory means.

13. A system for measuring the weight distribution on the axles of a motor vehicle and generating values corresponding to said respective axle weights of said motor vehicle wherein a force acting on a tractor air bag is detected, said system comprising:

(a) a tractor air bag pressure sensor for generating a first signal corresponding to the weight resting on the tractor air bag;

(b) a tractor fuel tank sensor for generating a second signal corresponding to the weight of fuel in the tractor fuel tank;

(c) a tractor fifth wheel position sensor for generating a third signal corresponding to the longitudinal position of the fifth wheel on the tractor;

(d) a calculating means electronically connected to said signals generated in (a), (b), and (c), said calculating means calculating the weight on the front axle of the tractor from said signals and one or more constant values;

(e) said calculating means calculating the weight on the rear axle or axles of the tractor from said signals and one or more constant values;

(f) said calculating means calculating the weight on the axles of the trailer from said signals and one or more constant values;

(g) said calculating means generating signals corresponding to said weights on said axles of said vehicle.

14. A system, according to claim 13, wherein the calculating means includes memory means, and means for reading from said memory means, containing a gross weight of the tractor and trailer combination, the weight resting on the front axles of the tractor in an unloaded and unfueled state, the weight resting on the rear axle or axles of the tractor in an unloaded and unfueled state, the weight resting on the tractor air bag when the tractor is in an unloaded and unfueled state, the distance from the center of the front axle of the tractor to the center of gravity of the fuel tank or tanks, and the distance from the center of the front axle of the tractor to the center of the rear axle, if there is a single rear axle, or to the midpoint between the rear axles, if there are more than one axles.

15. A system for measuring the weight distribution on the axles of a tractor-trailer combination and generating values corresponding to said respective axle weights of the combination wherein a force acting on a tractor fifth wheel is detected, said system comprising:

(a) a tractor fifth wheel force sensor for generating a first signal corresponding to the weight resting on the tractor fifth wheel;

(b) a tractor fuel tank sensor for generating a second signal corresponding to the weight of fuel in the tractor fuel tank;

(c) a tractor fifth wheel position sensor for generating a third signal corresponding to the longitudinal position of the fifth wheel on the tractor;

(d) a calculating means electronically connected to said signals generated in (a), (b), and (c), said calculating means calculating the weight on the front axle of the tractor from said signals and one or more constant values;

(e) said calculating means calculating the weight on the rear axle or axles of the tractor from said signals and one or more constant values;

(f) said calculating means calculating the weight on the axles of the trailer from said signals and one or more constant values;

(g) said calculating means generating signals corresponding to said weights on said axles of said vehicle.

16. A system, according to claim 15, wherein the calculating means includes memory means, and means for reading from said memory means, containing a gross weight of the tractor and trailer combination, the weight resting on the front axles of the tractor in an unloaded and unfueled state, the weight resting on the rear axle or axles of the tractor in an unloaded and unfueled state, the distance from the center of the front axle of the tractor to the center of gravity of the fuel tank or tanks, and the distance from the center of the front axle of the tractor to the center of the rear axle, if there is a single rear axle, or to the midpoint between the rear axles, if there are more than one axles.

17. A method for measuring the gross weight of a moving motor vehicle and generating a value corresponding to said weight of said moving vehicle, said method comprising the steps of:

(a) generating by sensing means a first acceleration signal at a first point in time and storing said acceleration signal into a memory means within a computing means;

(b) generating by sensing means a first force signal at a first point in time and storing said force signal into the memory means;

(c) generating by sensing means a second acceleration signal at a second point in time and storing said acceleration signal into the memory means, said second point in time being less than one second after said first point in time;

(d) generating by sensing means a second force signal at a second point in time and storing said force signal into the memory means, said second point in time being less than one second after said first point in time;

(e) generating by sensing means a third acceleration signal at a third point in time and storing said acceleration signal into the memory means, said third point in time being less than one second after said second point in time;

(f) generating by sensing means a third force signal at a third point in time and storing said force signal into the memory means, said third point in time being less than one second after said second point in time;

(g) determining by computing means and storing into the memory means a first difference in value between said first and second acceleration signals;

(h) determining by computing means and storing into the memory means a first difference in value between said first and second force signals;

(i) determining by computing means and storing into the memory means a second difference in value between said second and third acceleration signals;

(j) determining by computing means and storing into the memory means a second difference in value between said second and third force signals;

(k) calculating the gross weight of said vehicle using the differences calculated in steps (g) through (j); and (l) generating a signal representing value of said weight calculated in step (k).

18. A method, according to claim 17, wherein the step of calculating the gross weight by computing means of said vehicle using the differences calculated in steps (g) through (j) includes the step of solving by computing means the equations:

$$D = (VF, VA) \cdot (\Delta F, \Delta a)$$

$$(VF', VA') = (VF, VA) + (SIGN (D)) \cdot (\Delta F, \Delta a)$$

$$\text{Gross Vehicle Weight} = \frac{VF'}{VA'},$$

for Gross Vehicle Weight, wherein (VF, VA) is a vector whose slope represents a current estimate of the inverse of the weight of the vehicle and whose elements are composite estimates of force and acceleration, ($\Delta F$, $\Delta a$) is a vector composed of a force difference and an acceleration difference, and SIGN(D) is a scaler that represents the arithmetic sign (being either −1 or +1) of the quantity D.

19. A method for measuring the gross weight of a moving motor vehicle and generating a value corresponding to said gross weight, said method employing a single sensor that simultaneously senses torque and velocity of a rotating member of said vehicle and comprising the steps of:

(a) generating by sensing means a first velocity signal at a first point in time, said velocity signal representative of the velocity of the vehicle;

(b) generating by sensing means a second velocity signal at a second point in time, said second point in time being less than one second after said first point in time;

(c) determining by computing means a first acceleration value from the first and second velocity signals and storing said first acceleration value into a memory means within a computing means;

(d) generating by sensing means a first torque signal at said second point in time and storing said torque signal into the memory means, said torque signal representative of the torque applied to the rotating member of the vehicle;

(e) generating by sensing means a third velocity signal at a third point in time, said third point in time being less than one second after said second point in time;

(f) determining by computing means a second acceleration value at said second and third velocity signals and storing said second acceleration value into the memory means;

(g) generating by sensing means a second torque signal at said third point in time and storing said second torque signal into the memory means;

(h) generating by sensing means a fourth velocity signal at a fourth point in time, said fourth point in time being less than one second after said third point in time;

(i) determining by computing means a third acceleration value from said third and fourth velocity signals and storing said third acceleration value into the memory means;

(j) generating by sensing means a third torque signal at said fourth point in time and storing said third torque signal into the memory means;

(k) determining by computing means a force value corresponding to each of said first, second, and third torque signals and storing the resulting first, second, and third force values into the memory means;

(l) determining by computing means a first acceleration difference between said first and second acceleration values and storing said first acceleration difference into the memory means;

(m) determining by computing means a first force difference between said first and second force values and storing said tin force difference into the memory means;

(n) determining by computing means a second acceleration difference between said second and third acceleration values and storing said second acceleration difference into the memory means;

(o) determining by computing means a second force difference between said second and third force values and storing said second force difference into the memory means;

(p) calculating by computing means the gross weight of said vehicle using the differences calculated in steps (l) through (o); and (q) generating a signal representing the value of said weight calculated in step (p).

20. A method, according to claim 19, wherein the step of calculating by computing means the gross weight of said vehicle using the differences calculated in steps (l) through (o) includes the step of solving by computing means the equations:

$$D = (VF, VA) \cdot (\Delta F, \Delta a)$$

$$(VF', VA') = (VF, VA) + (SIGN(D)) * (\Delta F, \Delta a)$$

$$\text{Gross Vehicle Weight} = \frac{VF'}{VA'},$$

for Gross Vehicle Weight, wherein $(VF, VA)$ is a vector whose slope represents a current estimate of the inverse of the weight of the vehicle and whose elements are composite estimates of force and acceleration, $(\Delta F, \Delta a)$ is a vector composed of a force difference and an acceleration difference, and SIGN(D) is a scaler that represents the arithmetic sign (being either $-1$ or $+1$) of the quantity D.

* * * * *